United States Patent
Al Ibrahim

(10) Patent No.: US 11,391,856 B2
(45) Date of Patent: Jul. 19, 2022

(54) STOCHASTIC DYNAMIC TIME WARPING FOR AUTOMATED STRATIGRAPHIC CORRELATION

(71) Applicant: Saudi Arabian Oil Company, Dhahran (SA)

(72) Inventor: Mustafa A. Al Ibrahim, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/923,894

(22) Filed: Jul. 8, 2020

(65) Prior Publication Data

US 2022/0011457 A1    Jan. 13, 2022

(51) Int. Cl.
*G01V 1/28*    (2006.01)

(52) U.S. Cl.
CPC ........ *G01V 1/282* (2013.01); *G01V 2210/665* (2013.01)

(58) Field of Classification Search
CPC .......................... G01V 1/282; G01V 2210/665
See application file for complete search history.

(56) References Cited

U.S. PATENT DOCUMENTS

| | | |
|---|---|---|
| 5,771,318 A | 6/1998 | Fang et al. |
| 6,246,963 B1 | 6/2001 | Cross et al. |
| 6,754,588 B2 | 6/2004 | Cross et al. |
| 8,170,288 B2 | 5/2012 | Wang et al. |
| 10,067,255 B2 | 9/2018 | Colombo et al. |
| 2009/0150313 A1* | 6/2009 | Heilper ................. G16B 30/00 706/13 |
| 2011/0096626 A1 | 4/2011 | Zhu et al. |
| 2014/0316706 A1* | 10/2014 | Grant ..................... G01V 1/362 702/11 |

(Continued)

FOREIGN PATENT DOCUMENTS

| | | |
|---|---|---|
| WO | WO2014172565 | 10/2014 |
| WO | WO2016115437 | 7/2016 |

(Continued)

OTHER PUBLICATIONS

Bilel Ali et al., Accurate and fast Dynamic Time Warping approximation using upper bounds, 2015, IEEE, pp. 1-6 (Year: 2015).*

(Continued)

*Primary Examiner* — Mischita L Henson
(74) *Attorney, Agent, or Firm* — Fish & Richardson P.C.

(57) ABSTRACT

Implementations of the present disclosure provide techniques for stochastic stratigraphic correlation that produce quantitative estimation of uncertainty by generating multiple viable correlations. In contrast to deterministic models where the output of the model is fully determined by the parameter values and the initial conditions, stochastic models possess some inherent randomness. Using stochastic models, the same set of parameter values and initial conditions will lead to an ensemble of different outputs. The described techniques include introducing probabilistic sampling into dynamic time warping processes. In some implementations, the techniques allow for a user to interactively update correlation markers and their associated uncertainties. The techniques can adhere to these markers and produce multiple viable solutions.

19 Claims, 15 Drawing Sheets

(56) References Cited

U.S. PATENT DOCUMENTS

| | | | |
|---|---|---|---|
| 2018/0225778 A1* | 8/2018 | Grant | G06Q 10/06395 |
| 2019/0331812 A1* | 10/2019 | Liu | G06T 17/05 |
| 2019/0383133 A1 | 12/2019 | Pollack et al. | |
| 2020/0160173 A1 | 5/2020 | Pandey et al. | |
| 2020/0233110 A1* | 7/2020 | Chaudhuri | G01V 1/306 |

FOREIGN PATENT DOCUMENTS

| | | |
|---|---|---|
| WO | WO2019021247 | 1/2019 |
| WO | WO2010002601 | 1/2020 |
| WO | WO2020117670 | 6/2020 |

OTHER PUBLICATIONS

Baerg, "Travel time in media with linear velocity-depth functions" CREWES Research Reports, 1991, 461-466, 6 pages.

Colombo et al., "Fully automated near-surface analysis by surface-consistent refraction method", Geophysics, 81, No. 4, Jun. 2016, U39-U49, 11 pages.

Colombo et al., "pQC: A novel approach for robust automatic near-surface analysis in low-relief geology" The Leading Edge, Nov. 2016, 952-960, 9 pages.

Hart et al., "Improving the reliability of first break picking with neural networks" 66th Annual International Meeting, SEG, Expanded Abstracts, 1996, 1662-1665, 4 pages.

Keho et al., "Revisiting Automatic First Arrival Picking for Large 3D Land Surveys" SEG Houston 2009 International Exposition and Annual Meeting, 2009, 3198-3202, 5 pages.

Luo et al., "Edge Preserving Smoothing and Applications" The Leading Edge, vol. 21, Iss. 2, Feb. 2002, 136-141, 158, 5 pages.

Sabbione et al., "Automatic first-breaks picking: new strategies and algorithms" Geophysics, 75, No. 4, 2010, V67-V76, 10 pages.

Edwards et al., "Uncertainty management in stratigraphic well correlation and stratigraphic architectures: A training-based method." Computers & Geosciences 111, Feb. 2018, 36 pages.

PCT International Search Report and Written Opinion in International Appln. No. PCT/US2021/040831, dated Oct. 15, 2021, 15 pages.

* cited by examiner

STOCHASTIC DYNAMIC TIME WARPING FOR AUTOMATED STRATIGRAPHIC CORRELATION

TECHNICAL FIELD

The present disclosure generally relates to automated stratigraphic correlation, including systems and methods for stochastic dynamic time warping for incorporating uncertainty into automated stratigraphic correlation of data regarding subsurface formations.

BACKGROUND

In geology, sedimentary facies are bodies of sediment that are recognizably distinct from adjacent sediments that resulted from different depositional environments. Generally, geologists distinguish facies by aspects of the rock or sediment being studied. Geologists and geophysicists perform investigations to map and interpret sedimentary facies and other geologic features for applications, for example, identification of potential petroleum reservoirs. These investigations can include, for example, conducting seismic surveys and drilling exploration wells. Exploration wells can provide well log data, mud log data, borehole cuttings interpretations, and chemo-stratigraphic data (for example, X-ray fluorescence and X-ray diffraction results).

Stratigraphic correlation can refer to the geological study concerned with establishing geochronological relationships between different areas, based on geologic investigations of many local successions. The process of stratigraphic correlation can include determining the equivalence of age or stratigraphic position of layered rocks in different areas. It can be important to understanding earth history because stratigraphic correlation can be one of the principal methods by which the succession and synchrony of geological events are established. The process can be applied on several types of datasets, such as seismic data, well log data, mud log data, borehole cuttings interpretations, and chemo-stratigraphic data (for example, X-ray fluorescence and X-ray diffraction results). The correlation produced can be used in several workflows, such as depositional interpretation, provenance analysis, model building (for example, geologic model or reservoir model), and facies prediction. Traditionally, a geoscientist manually performs the process.

SUMMARY

Implementations of the present disclosure provide techniques for stochastic stratigraphic correlation that produce quantitative estimation of uncertainty by generating multiple viable correlations. In contrast to deterministic models where the output of the model is fully determined by the parameter values and the initial conditions, stochastic models possess some inherent randomness. Using stochastic models, the same set of parameter values and initial conditions will lead to an ensemble of different outputs.

In some implementations, the described techniques include introducing probabilistic sampling into dynamic time warping processes. In some implementations, the techniques allow for a user to interactively update correlation markers and their associated uncertainties. The techniques can adhere to these markers and produce multiple viable solutions.

In an aspect, computer-implemented methods of generating a model of a subsurface formation using stochastic stratigraphic correlation include: receiving data representing a plurality of signals representing stratigraphy of the subsurface formation at a plurality of locations; performing dynamic time warping; defining, based on the performing, one or more correlations of the stratigraphy of the subsurface formation at the at least one first location and the stratigraphy of the subsurface formation at the at least one second location; and generating the model of the subsurface formation based at least in part on the one or more correlations of the stratigraphy of the subsurface formation at the at least one first location and the stratigraphy of the subsurface formation at the at least one second location. Performing dynamic time warping can include: generating a cumulative distance matrix of the data representing the stratigraphy of the subsurface at least one first location and the data representing the stratigraphy of the subsurface at least one second location; and obtaining, by traversing the cumulative distance matrix according to a series of deterministic steps and intermittent stochastic steps, a minimum cost path over the cumulative distance matrix.

In an aspect, methods for stochastic correlation of stratigraphic data in a subsurface formation include: receiving data representing stratigraphy of the subsurface formation at a plurality of locations; generating a cumulative distance matrix of the data representing the stratigraphy of the subsurface at a first location of the plurality of locations and the data representing the stratigraphy of the subsurface at a second location of the plurality of locations; obtaining, by traversing the cumulative distance matrix according to a series of deterministic steps and intermittent stochastic steps, a minimum cost path over the cumulative distance matrix; defining, based on the performing, one or more correlations of the stratigraphy of the subsurface formation at the first location and the stratigraphy of the subsurface formation at the second location; and generating a correlation confidence measure for correlation markers indicating corresponding portions of the stratigraphy of the subsurface formation at the first location and the stratigraphy of the subsurface formation at the second location.

Embodiments of these methods can include one or more of the following features.

In some methods, the plurality of signals correspond to well logs at a plurality of wells.

In some methods, obtaining a minimum cost path over the cumulative distance matrix includes: performing a first number of deterministic steps; determining a correlation measure of the data corresponding to the first number of deterministic steps; and determining whether to perform a stochastic step based on the correlation measure. In some cases, the correlation measure comprises a Pearson correlation coefficient. In some cases, performing dynamic time warping further comprises performing the stochastic step if the correlation measure indicates a performance probability that satisfies a performance probability threshold, wherein performing the stochastic step includes converting values of the cumulative distance matrix at one or more possible steps to probabilities to determine a subsequent step.

In some methods, obtaining a minimum cost path over the cumulative distance matrix includes: assigning a plurality of markers to the cumulative distance matrix, each marker corresponding to a point of the cumulative distance matrix; and defining, for each marker, a probabilistic distribution.

In some methods, generating a cumulative distance matrix includes using Euclidian distance measure.

In some methods, the dynamic time warping is used to generate multiple viable correlations between the signals. In some cases, methods also include generating a correlation confidence measure for correlations between portions of the stratigraphy of the subsurface formation at one of the first locations and the stratigraphy of the subsurface formation at one of the second locations. In some cases, generating a correlation confidence measure comprises running multiple realizations of the dynamic time warping and ordering standard deviations in correlation markers between locations.

These and other aspects, features, and implementations can be expressed as methods, apparatus, systems, components, program products, methods of doing business, means or steps for performing a function, and in other ways, and will become apparent from the following descriptions, including the claims.

Implementations of these systems and methods can include one or more of the following advantages. Unlike traditional techniques that produce one deterministic solution and underestimate uncertainty in correlations, the described techniques can account for uncertainty to generate results while understanding the confidence in these results. In these systems and methods, user input requirements are decreased relative to traditional techniques, making automated stratigraphic correlation more efficient and less prone to user error.

The details of one or more implementations of these systems and methods are set forth in the accompanying drawings and the description to be presented. Other features, objects, and advantages of these systems and methods will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Stratigraphic correlation can be used in many geoscientific workflows. It can be applied on multiple types of datasets, including seismic data, well logs, mud logs, borehole cuttings interpretations, and chemo-stratigraphic data (for example, X-ray fluorescence and X-ray diffraction results). The correlation produced can be used in several workflows, such as depositional interpretation, provenance analysis, model building (for example, geologic model or reservoir model), and facies prediction, among others. Automated stratigraphic correlation can be considered. Some automated correlation techniques can include autocorrelation, rule-based systems for correlating well logs, dynamic time warping, seismic to well correlation.

Implementations of the present disclosure implement stochasticity into a dynamic time warping process to facilitate stratigraphic correlation. Unlike conventional automated and semi-automated stratigraphic correlation methods that produce one solution (for example, the most probable solution), the techniques described in this specification can advantageously facilitate incorporation of already known geologic data, such as already interpreted geologic surfaces, user interaction, reduced needs for assumptions regarding interpreted stratigraphic markers (for example, formation tops), and generation of uncertainty in the interpretation. Unlike conventional techniques, uncertainty in the interpreted stratigraphic surfaces can be considered.

Subsurface Formations

Figure 1:
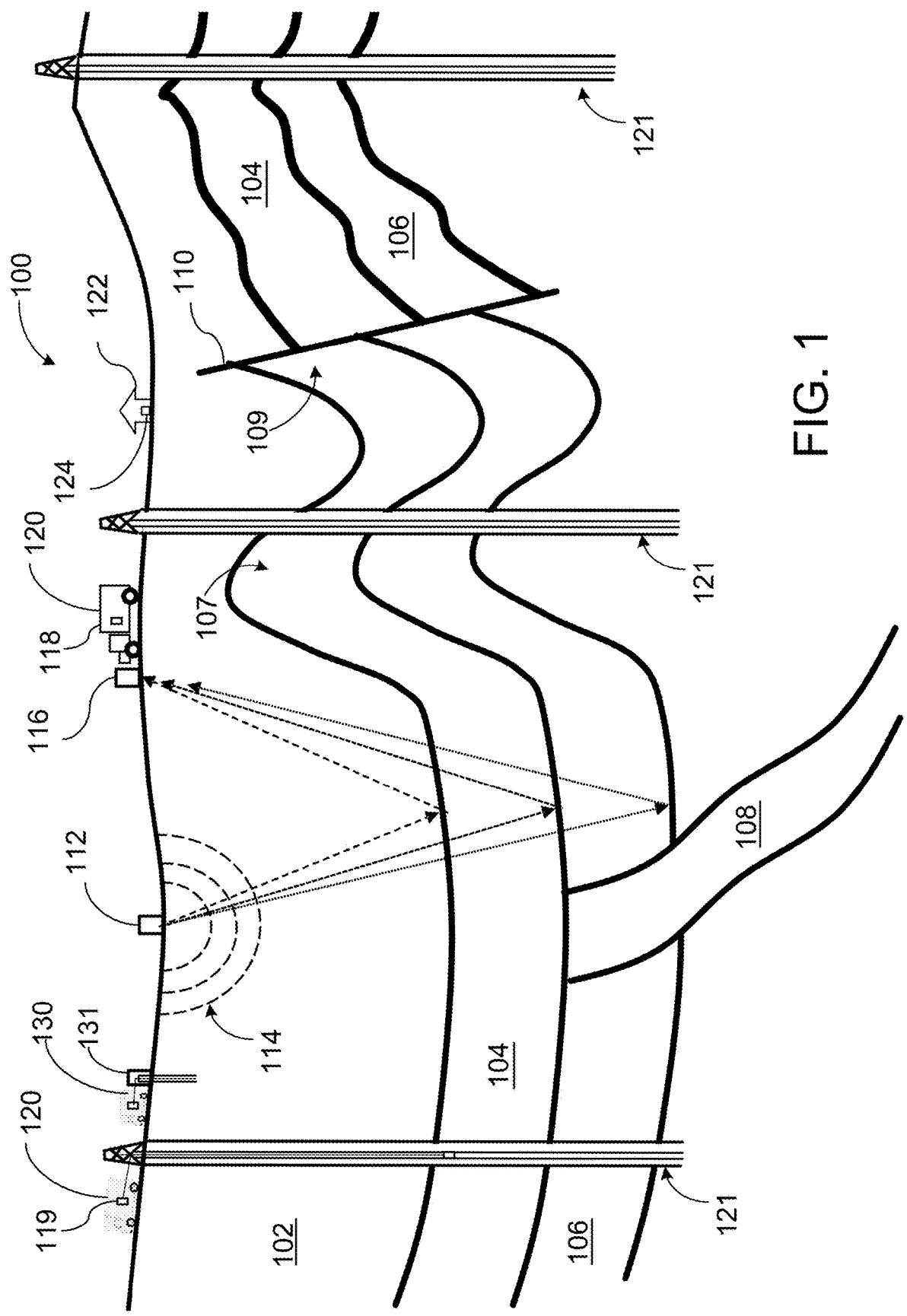
FIG. 1 is a schematic view of a investigations being performed to map features of the subsurface such as facies and faults.

FIG. 1 is a schematic view of investigations performed to map subsurface features such as facies and faults in a subsurface formation 100. The subsurface formation 100 includes a layer of impermeable cap rock 102 at the surface with multiple underlying layers 104, 106, and 108. A fault line 110 extends across the layers 104 and 106.

Oil and gas tend to rise through permeable reservoir rock until further upward migration is blocked, for example, by the layer of impermeable cap rock 102. Seismic surveys attempt to identify locations where interaction between layers of the subsurface formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

FIG. 1 illustrates several of the types of investigations that can provided data used in stratigraphic correlation to assess geochronological relationships between different areas of a subsurface formation (e.g., the subsurface formation 100). In particular, FIG. 1 illustrates a seismic survey, wireline well logging, and several exploration wells. Seismic surveys provide inferred information the subsurface features underlying large areas of a potential field. In contrast, wireline logging and exploration can provide detailed, directly measured information about specific locations in the potential field.

In a seismic survey, a seismic source 112 (for example, a seismic vibrator or an explosion) generates seismic waves that propagate in the earth. Although illustrated as a single component in FIG. 1, the source or sources 112 are typically a line or an array of sources 112. The velocity of these seismic waves depends on properties, for example, density, porosity, and fluid content of the medium through which the seismic waves are traveling. Different geologic bodies or layers in the earth are distinguishable because the layers have different properties and, thus, different characteristic seismic velocities. For example, in the subsurface formation 100, the velocity of seismic waves traveling through the subsurface formation 100 will be different in the layer 104, the layer 106, and the layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subsurface formation 100. The sensors 116 can be geophone-receivers that produce electrical output signals transmitted as input data, for example, to a computer 118 on a seismic control truck 120. Analysis of the signals generated by the sensors 116 can provide data of the depths and characteristics of the strata or facies of the subsurface formation 102.

FIG. 1 also shows several wells 121 extending from the surface into the subsurface formation 102. Well logs providing detailed local information regarding portions of the subsurface formation penetrated by the wells 121 can be generated during or after well drilling. The well logs can be based on visual inspection of samples brought to the surface (geological logs) or on physical measurements made by instruments lowered into the hole (geophysical logs).

Mud logs are well logs prepared by describing rock or soil cuttings brought to the surface by mud circulating in the borehole. Mud logs typically display parameters including formation gas, rate of penetration (ROP), lithology, gas hydrocarbons, flow line temperature (temperature of the drilling fluid) and chlorides. Some mud logs also include mud weight, estimated pore pressure and corrected d-exponent (corrected drilling exponent) for a pressure pack log.

Borehole cuttings interpretations provide another source of data regarding the subsurface formation. Cuttings are small pieces of formation that are chipped away by the bit while a well is being drilled. The rock fragments are transported from the bit to the surface by the drilling fluid. The cuttings are often the only physical lithological data that are recovered from a well. Analysis of the cuttings can be used for show evaluation, correlation of lithology to wireline logs, and other special geological, geophysical, or engineering analyses.

FIG. 1 also illustrated wireline logging being performed in the left-most well 121. Wireline logging to obtain a continuous record of a formation's rock properties. Wireline logging is performed by lowering a logging tool on the end of a wireline into a well while recording petrophysical properties using a variety of sensors. Sensors on logging tools can measure the natural gamma ray, electrical, acoustic, stimulated radioactive responses, electromagnetic, nuclear magnetic resonance, pressure and other properties of the rocks and their contained fluids.

The data itself is recorded either at surface (real-time mode), or in the hole (memory mode) to an electronic data format. Real-time data is recorded directly against measured cable depth. Memory data is recorded against time, and then depth data is simultaneously measured against time. The two data sets are then merged using the common time base to create an instrument response versus depth log.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subsurface formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subsurface formation or performing simulation, planning, and optimization of production operations of the wellsite systems.

Systems and Methods

Figure 2:
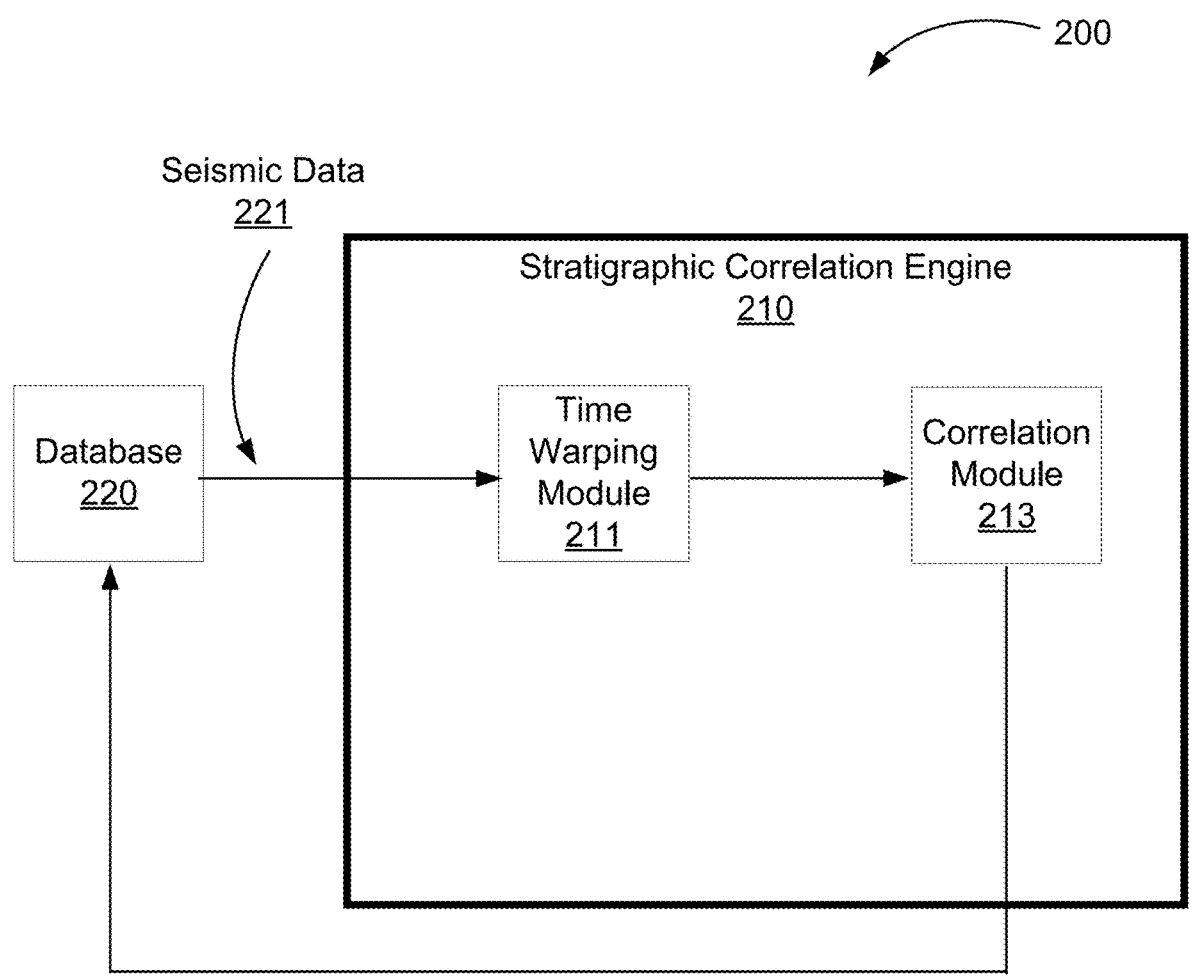
FIG. 2 is a block diagram illustrating an example system for automated stratigraphic correlation.

FIG. 2 is a block diagram illustrating an example system 200 for automated stratigraphic correlation. The system 200 includes a stratigraphic correlation engine 210 and a database 220.

The database 220 is configured to store data 221, such as the seismic data or well log data discussed with reference to FIG. 1. The database is communicatively coupled to the stratigraphic correlation engine 210. In the illustrated implementation, the database 220 is located locally relative to the stratigraphic correlation engine 210 (for example, integrated with the stratigraphic correlation engine 210 or share the same confines as the stratigraphic correlation engine 210). However, in some implementations, the database 220 is located remotely relative to the stratigraphic correlation engine 210 (for example, the database 220 can be integrated with a cloud computing environment).

The stratigraphic correlation engine 210 can include can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like.

In some implementations, the stratigraphic correlation engine 210 includes code-segment having executable instructions.

In some implementations, the stratigraphic correlation engine 210 includes processing mechanisms such as, for example, a general purpose processor, a central processing unit (CPU, at least one application specific integrated circuit (ASIC), general purpose programmable microprocessors, graphic processing units, special-purpose programmable microprocessors, digital signal processors (DSPs), programmable logic arrays (PLAs), field programmable gate arrays (FPGA), special purpose electronic circuits, among others, or a combination of them.

The stratigraphic correlation engine 210 is configured to receive the data 221. The data 221 can be received through any of various techniques, such as wireless communications with the database 220, optical fiber communications, USB, CD-ROM. In some implementations, the stratigraphic correlation engine 210 receives the data 221 directly from one or more sensors, such as the sensors 116 described previously with reference to FIG. 1.

The stratigraphic correlation engine 210 includes a time warping module 211 and a correlation module 213. The time warping module 211 is configured to perform stochastic dynamic time warping on the data 221. Performing stochastic dynamic time warping includes generating a cumulative distance matrix of the data (for example, using a euclidian distance measure). Performing stochastic dynamic time warping includes obtaining, by traversing the cumulative distance matrix according to a series of deterministic steps and intermittent stochastic steps, a minimum cost path over the cumulative distance matrix. In some implementations, obtaining a minimum cost path over the cumulative distance matrix includes performing a first number of deterministic steps, determining a correlation measure of the data corresponding to the first number of deterministic steps, and determining whether to perform a stochastic step based on the correlation measure. The correlation measure can include a Pearson correlation coefficient. In some implementations, performing dynamic time warping includes performing the stochastic step if the correlation measure indicates a performance probability that satisfies a performance probability threshold. In some implementations, performing the stochastic step includes converting values of the cumulative distance matrix at one or more possible steps to probabilities to determine a subsequent step. To obtain the minimum cost path, the time warping module 211 can prompt a user (for example, by rendering a user interface on a display of the stratigraphic correlation engine 210) to assign a plurality of markers to the cumulative distance matrix. Each marker can correspond to a point of the cumulative distance matrix. The time warping module 211 can define, for each marker, a probabilistic distribution. The dynamic time warping can be used to generate multiple viable correlations between signals of the data 221. Performing stochastic dynamic time warping is described later in further detail with reference to FIGS. 3-8.

Figure 10:
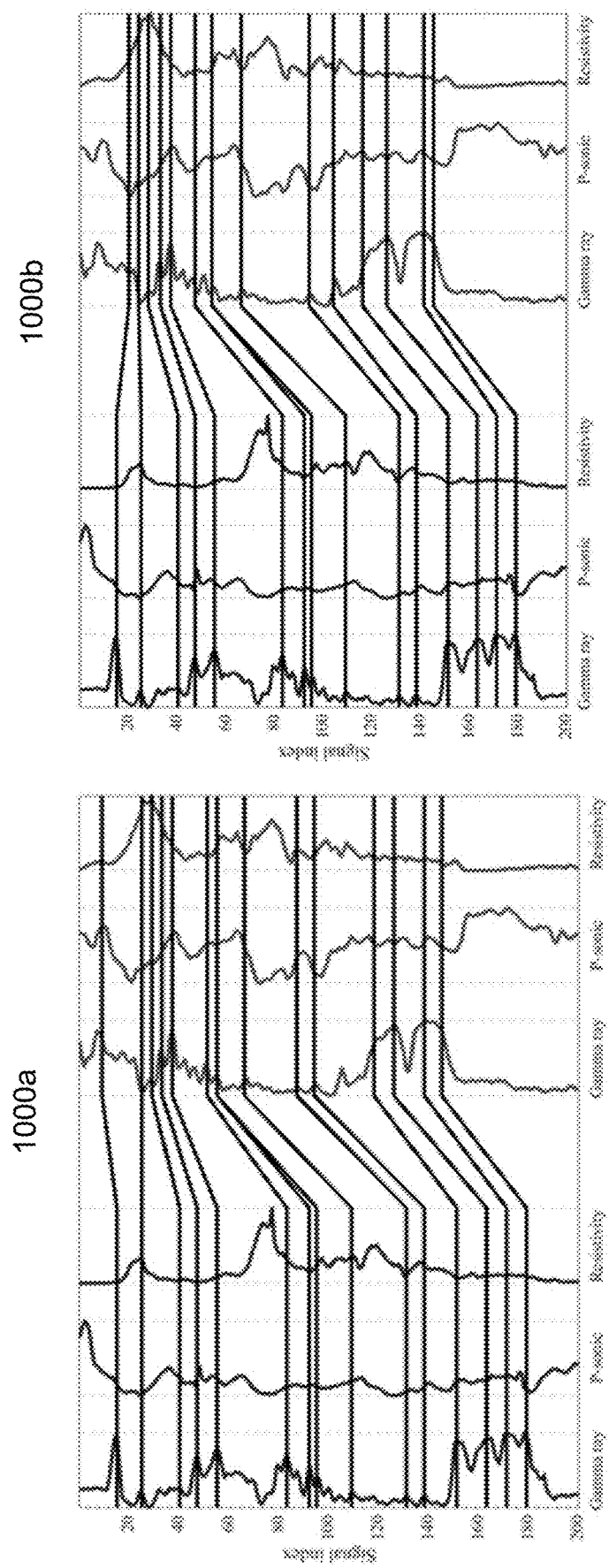
FIG. 10 is an example image illustrating results of a correlation solution obtained using generic dynamic time warping compared with results of a correlation solution obtained using stochastic dynamic time warping, as applied to the input data of FIG. 8.

The correlation module 213 is configured to define, based on the results of the dynamic time warping, one or more correlations of the data to generate a image (see, for example, FIG. 10).

Figure 3:
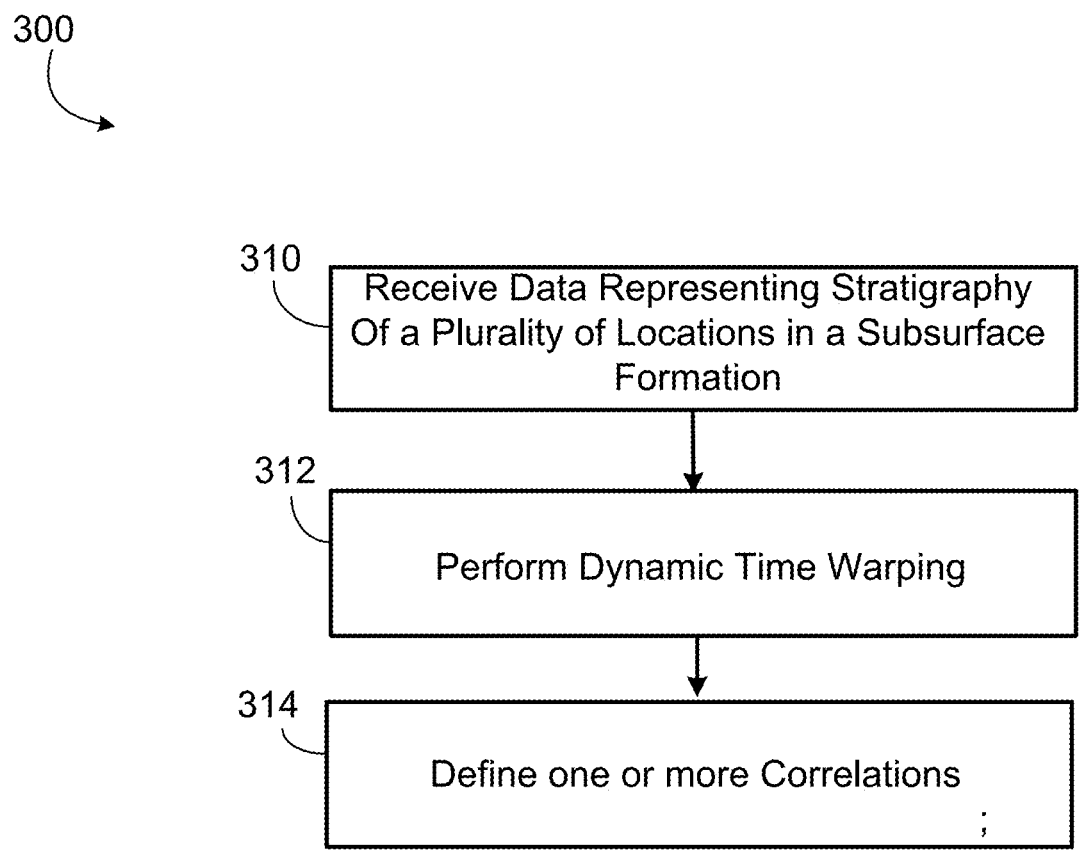
FIG. 3 is flowchart illustrating an example method for automated stratigraphic correlation.

FIG. 3 is flowchart illustrating an example method 300 for automated stratigraphic correlation. In some implementations, the system 200 discussed previously with reference to FIG. 2 performs all or portions of the method 300. The method 300 includes receiving data (block 310), performing dynamic time warping (block 312), and defining one or more correlations (block 314).

At block 310 data is received from a database, one or more sensors, or a combination of them. The data can represent a plurality of well logs or seismic signals captured during a seismic survey (for example, as described previously with reference to FIG. 1).

At block 312, stochastic dynamic time warping is performed on the data. Generally, dynamic time warping measures dissimilarities (for example, distances) between signals. The process can be specifically designed to facilitate alignment of signals having varying speeds. This can be done by non-linearly warping signals to obtain the best alignment possible. Generally, a generic dynamic time warping process can be divided into two phases: 1) calculation of the distance matrix and 2) traceback of the optimum path in the matrix. As an example, two signals x and y can be assumed to be of length $l_x$ and $l_y$ respectively, and dimension s. Positions can be stated with the symbols i and j for the signals x and y respectively.

In the first phase, a distance matrix is calculated. The definition of a distance matrix can depend on the data used and the results desired. One distance measure that can be used is the Euclidian distance ($d_E$), which can be defined as:

$$d_E(x_i, y_j) = \sqrt{\Sigma(x_{i,s} - y_{i,s})^2} \quad (1)$$

for two multi-dimensional points from signals x and y. Because dynamic time warping typically operates in the distance space, it can be readily usable for multi-dimensional signals, as many distance measures can be defined for multi-dimensional signals. This can be important in stratigraphic correlation, as the data can typically be multi-dimensional (for example, correlation of multiple well logs). Examples of other distance measures include the Mahalanobis and Minkowski distances.

Figure 4:
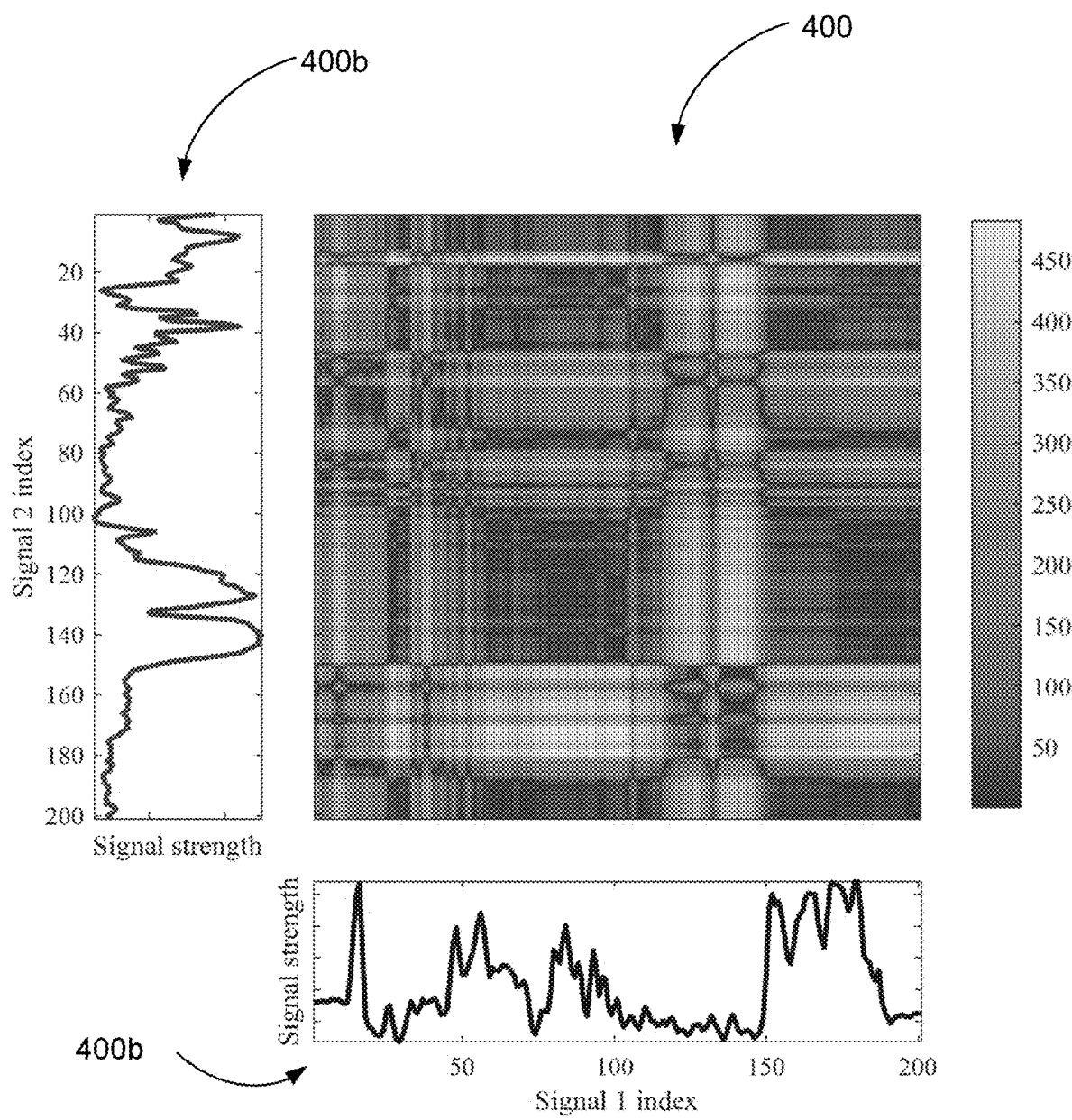
FIG. 4 is an example image illustrating a Euclidian distance matrix of two signals.

FIG. 4 is an example image illustrating a Euclidian distance matrix 400 of two signals 400a, 400b. As illustrated, brighter colors in the matrix 400 correspond to larger distances. Each point in the matrix measures the distance between two values in the two signals.

Referring back to FIG. 3, the traceback phase obtains the best alignment. This is done by obtaining the minimum cost path (dtw) over the distance matrix, which can be defined as $$dtw(x_{l_i}, y_{l_j}) = \min(\Sigma_{k=1}^{K} w_{x_i, y_j, k}) \text{ under conditions 1,2, and 3} \quad (2)$$

where $w_{x_i, y_j}$ is the distance between point i in signal x and point j in signal y. Three conditions can be considered for choosing the optimum path: 1) boundary condition, 2) continuity condition, and 3) monotonicity condition. The boundary condition stipulates that the first and last points of the first signal is correlated with the first and last points of the second signal (e.g., the points (1,1) and ($l_i$, $l_j$)). The continuity condition restricts the allowable steps in the distance matrix to the adjacent cells, including edge adjacent. The monotonicity condition restricts the selected points to be monotonically increasing. This can prevent any defined correlation lines from crossing.

Dynamic programming can be used to recursively find the shortest path between the end points. As part of the of the dynamic time warping process, a cumulative distance matrix (γ) is calculated, which can define the minimum cumulative cost from the starting point (1,1) to the point (i,j). Using the conditions described previously, the dynamic time warping process can be generally defined as $$\gamma(i,j) = d(x_i, y_j) + \min(\gamma(i-1, j-1), \gamma(i-1, j), \gamma(i, j-1)) \quad (3)$$

where d is the distance measure chosen. The function is recursive. While performing this operation, a list to track the minimum cost path can be stored. Equation 3 shows the solution along with the distance matrix computed.

Figure 5A:
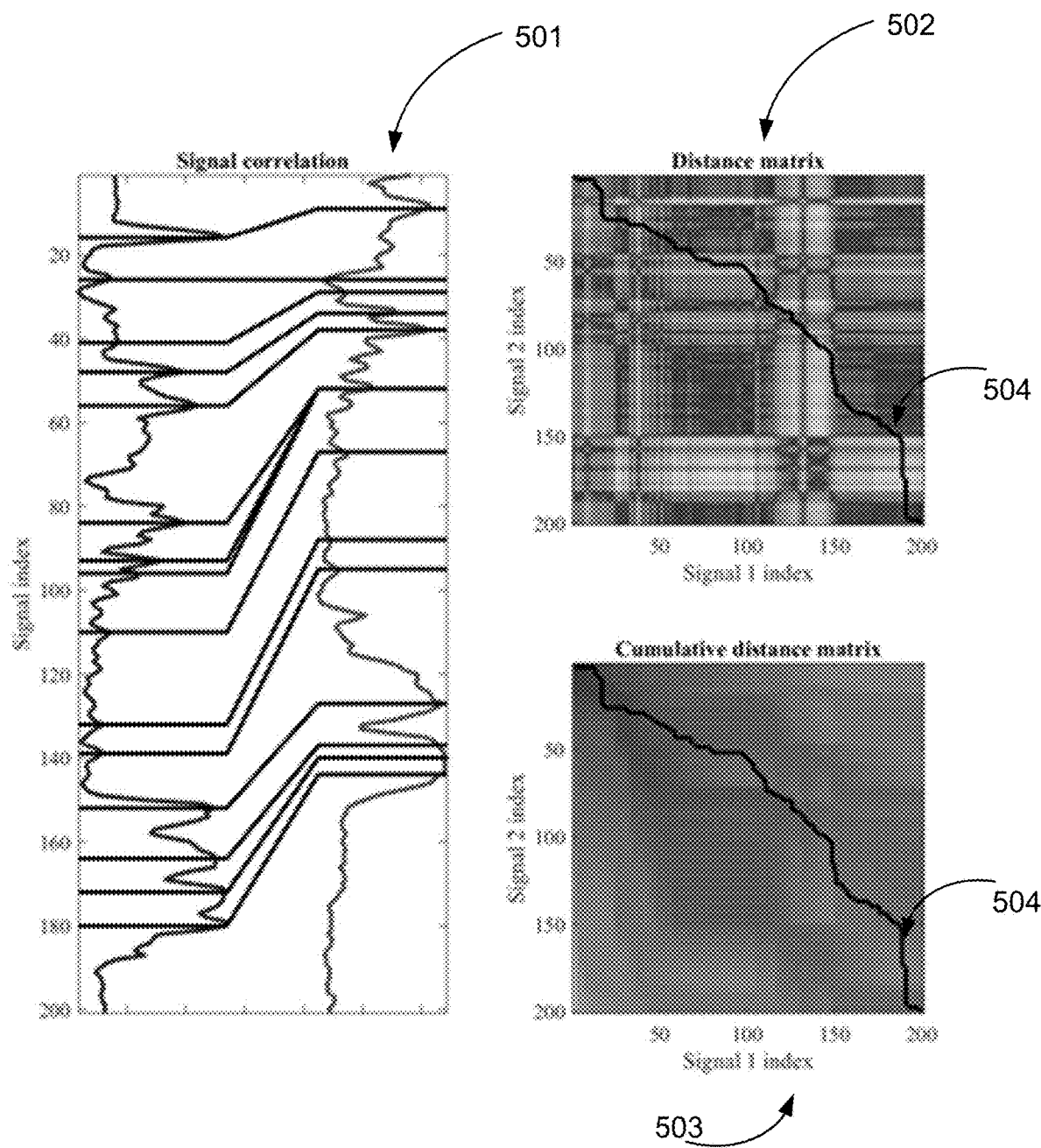
FIG. 5A is an example image illustrating a signal correlation panel, a distance matrix, and a cumulative distance matrix.
Figure 5B:
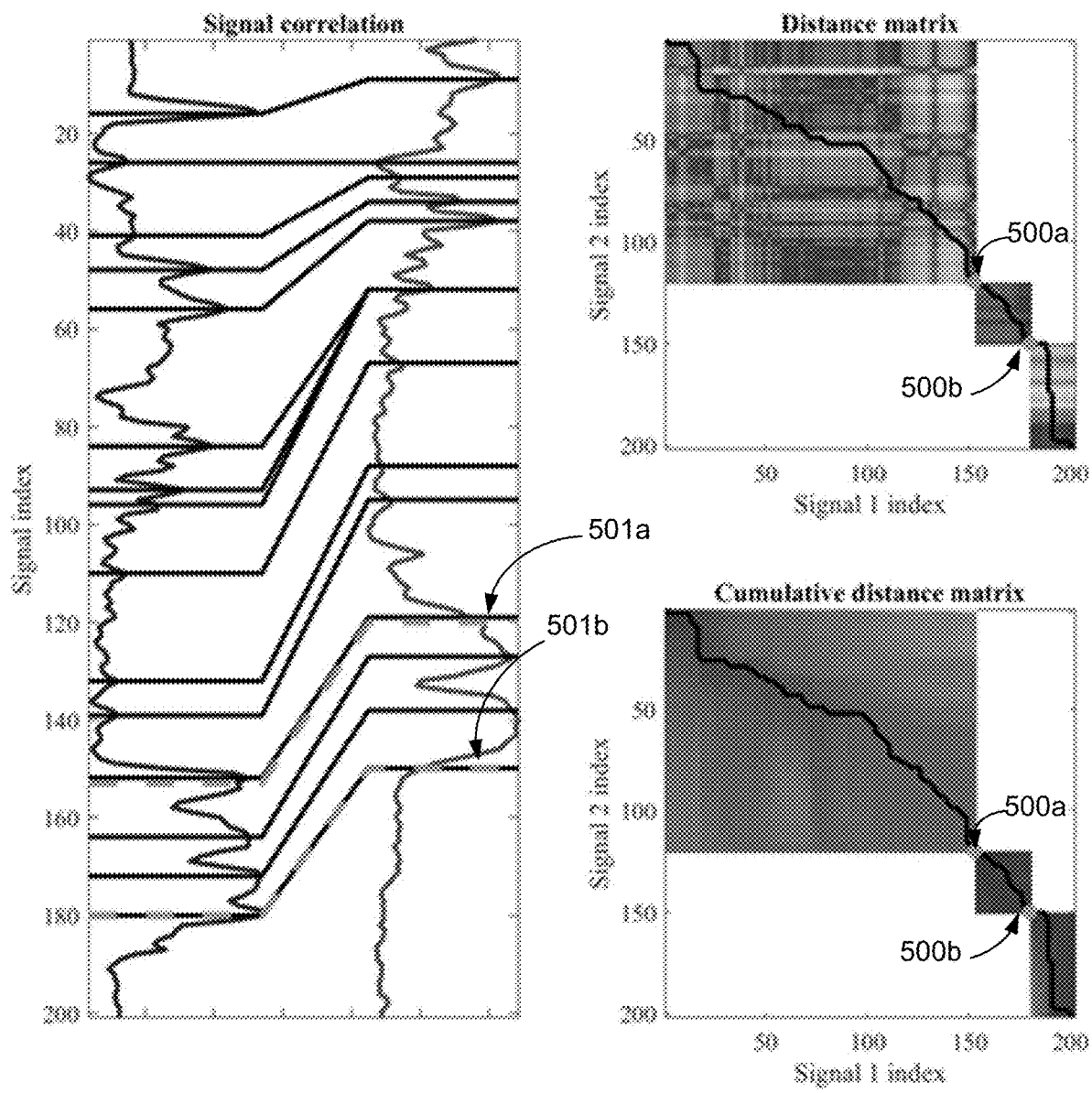
FIG. 5B illustrates two hard markers used in dynamic time warping applied to the signal correlation panel of FIG. 5A.

FIG. 5A is an example image illustrating a signal correlation panel 501, a distance matrix 502, and a cumulative distance matrix 503. As illustrated, generic dynamic time warping is applied to two signals. The correlation lines of the signal correlation panel 501 do not cross as a consequence of condition 3 in the minimum cost path search process, as described previously. The minimum cost path 504 is obtained from the cumulative distance matrix 503. As illustrated, correlation lines are only shown for specific points identified by a change point analysis.

Referring back to FIG. 3, markers can be used during the generic dynamic time warping process. Markers can refer to constraint points where the correlation between the signals are defined manually by a user. Examples of markers are formation tops, casing points, and important chronostratigraphic surfaces. In some implementations, to ensure that the chosen path follows the set markers, the traceback phase subdivided to (m+1) subproblems punctuated by the markers, where m is the number of markers (excluding end-point markers).

5B illustrates two hard markers 501a, 501b used in dynamic time warping. As illustrated, the correlation solution (illustrated by the signal correlation panel 501) is constrained by the hard markers 501a, 501b. Use of markers can simplify the problem, as large parts of the cumulative distance matrix does not need to be evaluated (thus, increasing computation efficiencies and decreasing computation power and resource requirements). A user (such as a geoscientist) can pick the major surfaces, formation tops, or markers, and an algorithm can be used to pick minor markers in between. Another application of hard makers in stratigraphic correlation is to interactively modify the automated correlation solution.

Referring back to FIG. 3, to construct the cumulative distance tensor, a complexity of $O(n^d)$ can be used, where d is the number of signals aligned. This can cause the process to be practically intractable for three or more signals alignment problem in its current formulation. Heuristics can be used to simplify the problem. For example, a FastDTW method can be used to approximate the optimum solution by using a multiscale procedure to recursively refine the solution at a finer scale, resulting in a linear complexity. A lower bounding technique can be used that globally constrains the solution using an envelope.

In the illustrated implementation, the generic dynamic time warping process is extended to produce multiple realizations (that is, possible solutions). The cumulative distance matrix is constructed similar to the generic dynamic time warping process described previously. The cumulative distance matrix is then traversed during the traceback phase in a semi-stochastic manner.

The traceback phase can be characterized by dynamic warping traceback steps (that is, deterministic steps, with intermittent stochastic steps). The decision to traverse the next step in a stochastic manner depends on the correlation observed in the data in the n-previous steps, where n is a hyperparameter defined by the user. A sample Pearson correlation coefficient (ρ) is used as a correlation measure, which can be defined as $$\rho(x,y) = \text{cov}(x,y)/\sigma_x \sigma_y \quad (4)$$

where x and y are the multidimensional signals as described previously. The correlation measure used is transformed to a probability using a softmax distance to probability transformation using the formulation $$\alpha(z)_i = e^{-z_i}/\sum_{k=1}^{K} e^{z_k} \quad (5)$$

where z is the distance measure (for example, the Pearson correlation coefficient ρ), and σ is the probability. If the correlation coefficient is used, Equations 4 and 5 can be combined to obtain $$p = 1 - e^{-|\rho|}/e^{-|\rho|} + e^{-|1-\rho|} \quad (6)$$

where p is the probability of performing a stochastic step. The probability is then sampled to determine if a stochastic step is performed. To perform the stochastic step, the values of the distance matrix at the possible steps are converted to probabilities following Equation 6 and sampled. The sampled step is used as the choice to continue the path in the cumulative distance matrix. Because the decision to perform a stochastic step is determined by the previous steps, it may be important that n-steps are taken deterministically at the beginning of the traceback. These steps maybe referred to in this specification as warming-up steps.

Figure 6:
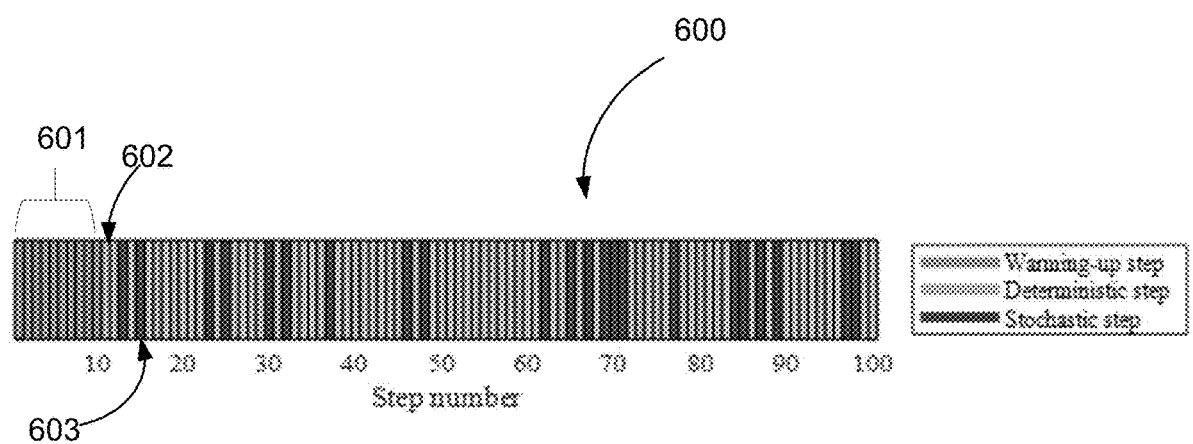
FIG. 6 is an example image illustrating a simulation of steps taken during a stochastic dynamic time warping process.

FIG. 6 is an example image illustrating a simulation 600 of steps taken during a stochastic dynamic time warping process. As illustrated, the warming-up steps 601 include a predefined number of deterministic steps. Following the warming-up steps 601 are a series of deterministic steps 602 and intermittent stochastic steps 603. As illustrated, the simulation 600 assumes a correlation coefficient that is independently sampled for each step from a truncated normal distribution with a mean of 0.7 and a standard deviation of 0.2.

Referring back to FIG. 3, the markers used in the described stochastic framework are soft (that is, the traceback procedure obey the markers probabilistically). A probabilistic distribution is defined for each marker. The distribution can be empirical or theoretical. For example, a multinormal distribution can be used around the mode position with a covariance that reflects the uncertainty in the marker. The distribution defines the probability of the marker being in certain signal position. To perform the traceback with soft markers, in each realization, the distribution is sampled, and the position is used in a similar fashion to the generic dynamic time warping process described previously, where the problem is subdivided into several smaller sub-problems. It can be important to force the sampled markers to satisfy the monotonicity condition defined previously by sampling them sequentially and updating the multi-variate probabilities dynamically (that is, calculating the conditional probabilities of the distributions), or by resampling the next marker until it satisfies the condition (for example, using falsification).

Figure 7:
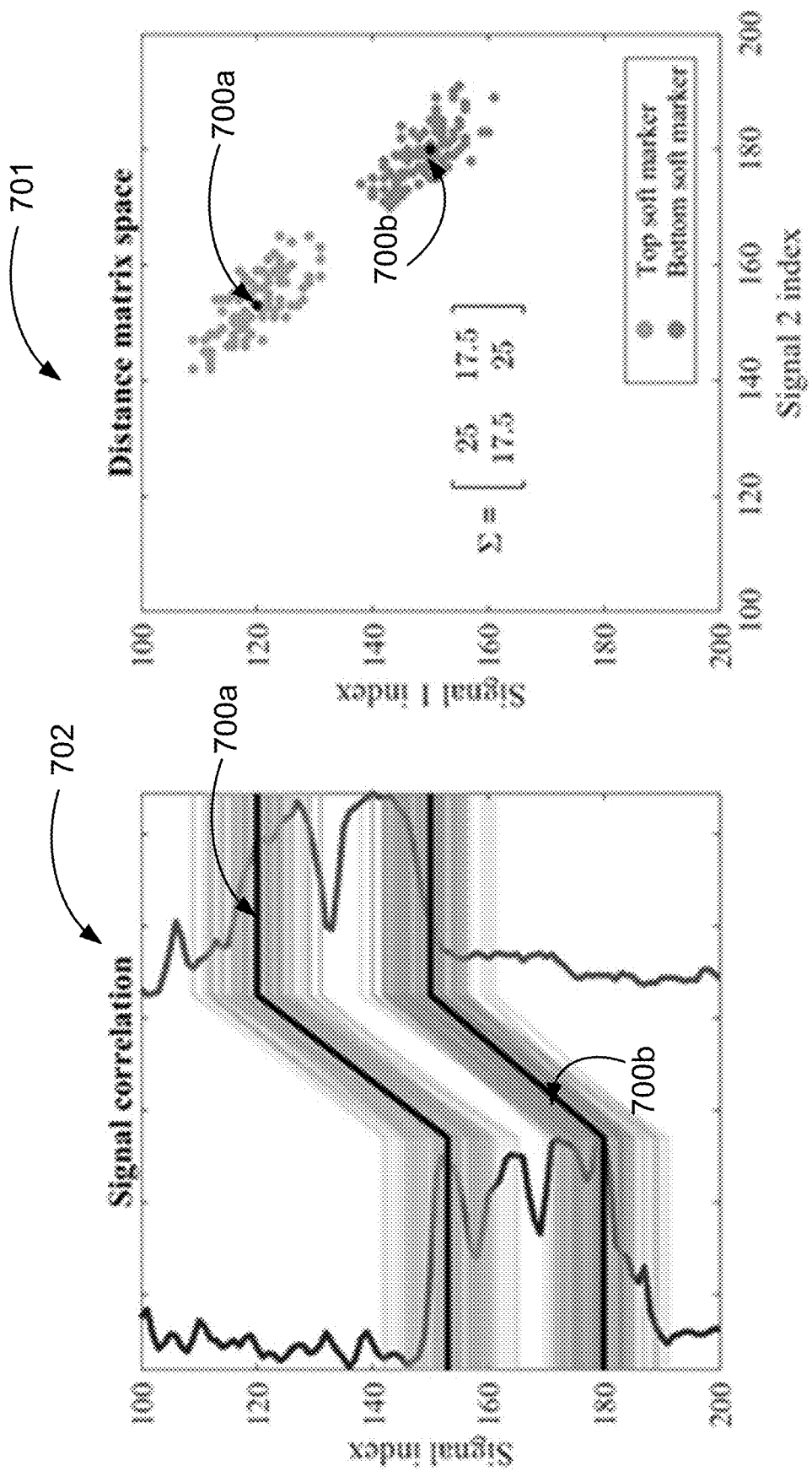
FIG. 7 is an example image of realizations of two soft markers in a distance matrix space and a signal correlation space.

FIG. 7 is an example image of realizations of two soft markers 700a, 700b in the distance matrix space 701 and the signal correlation space 702. In the illustrated implementation, both markers 700a, 700b include the same multinormal distribution with different means and similar covariances (as defined in Σ).

Referring back to FIG. 3, the described soft marker approach can also be used at the end points of the signal, removing the limitation of hard constraint end points described previously. This can be advantageous for specific applications where the start point and end point of a signal is unknown. In some cases, using soft end point markers may produce better signal alignment than hard markers.

At block 314, one or more correlations of the signals are determined based on the results of the stochastic dynamic time warping, and a signal correlation panel is generated (see FIG. 10).

Experimental Results

The described techniques can be readily applied on borehole or seismic data for stratigraphic correlation. An experiment was conducted to illustrated the described techniques in the context of borehole well-to-well correlation using well logs. The well logs were measured from vertical boreholes in the United States that are about three kilometers apart. Three well logs were used: Gamma ray, compressional sonic, resistivity.

Figure 8:
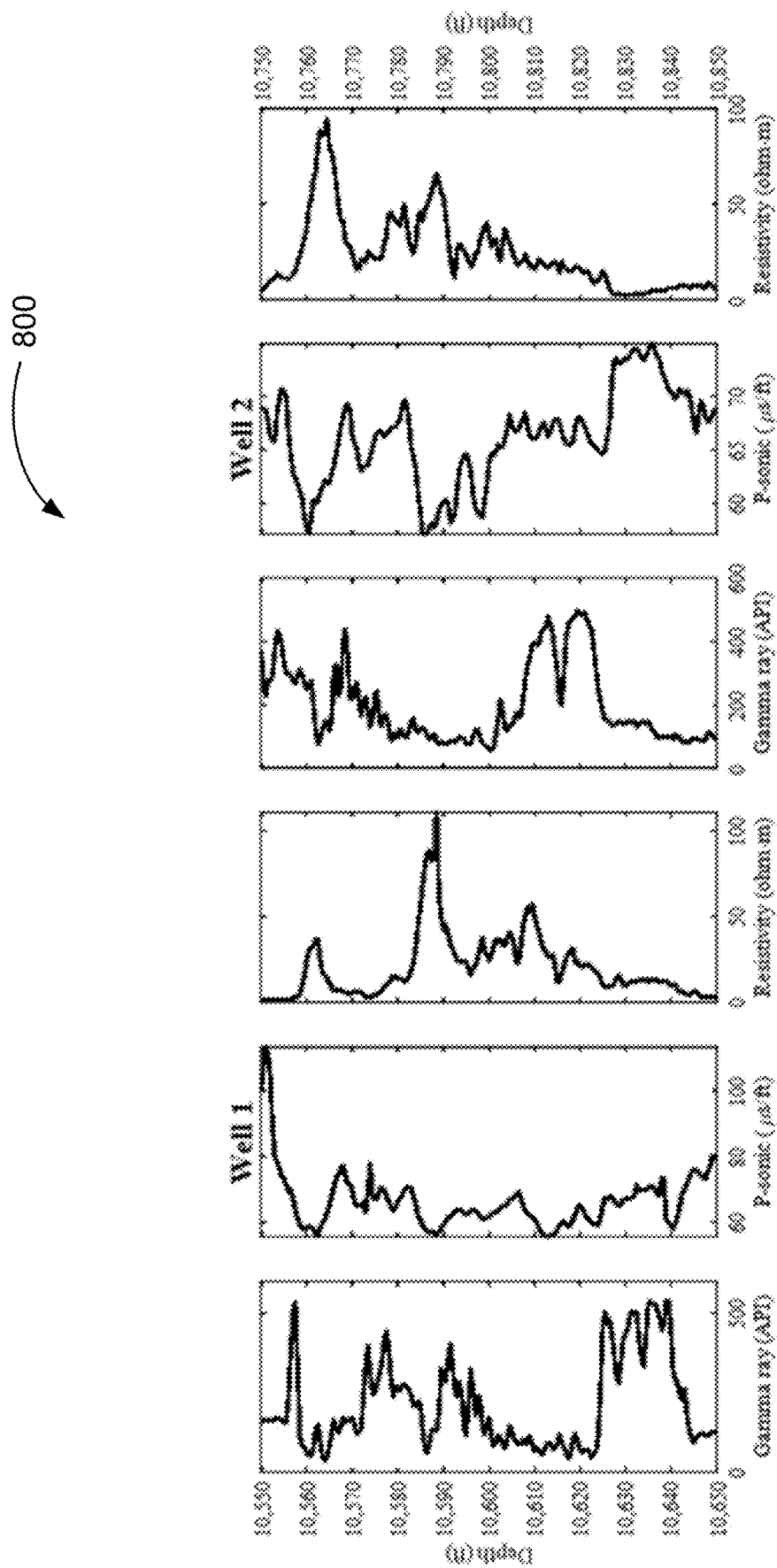
FIG. 8 is an example image illustrating input data for an experiment using automated stratigraphic correlation techniques described in this specification.

FIG. 8 is an example image illustrating input data 800 for an experiment using automated stratigraphic correlation techniques described in this specification. The well logs were first normalized using z-score normalization as defined by the formulation $$l_{i,zscore} = l_i - \text{mean}(l)/std(l) \quad (7)$$

where l is one well log type at one well, mean is the arithmetic average, and std is the standard deviation. Normalization can be important because the well logs are of different data types with generally different ranges of values. Thus, normalization can prevent one type of well logs from overwhelming others during the analysis and ensure that they are given equal weight during the distance matrix calculation. Intentional bias based on, for example, expert opinion can be introduced after the normalization, if desired.

The distance matrix and the cumulative distance matrix were constructed using Euclidean distance of the normalized well logs.

Figure 9:
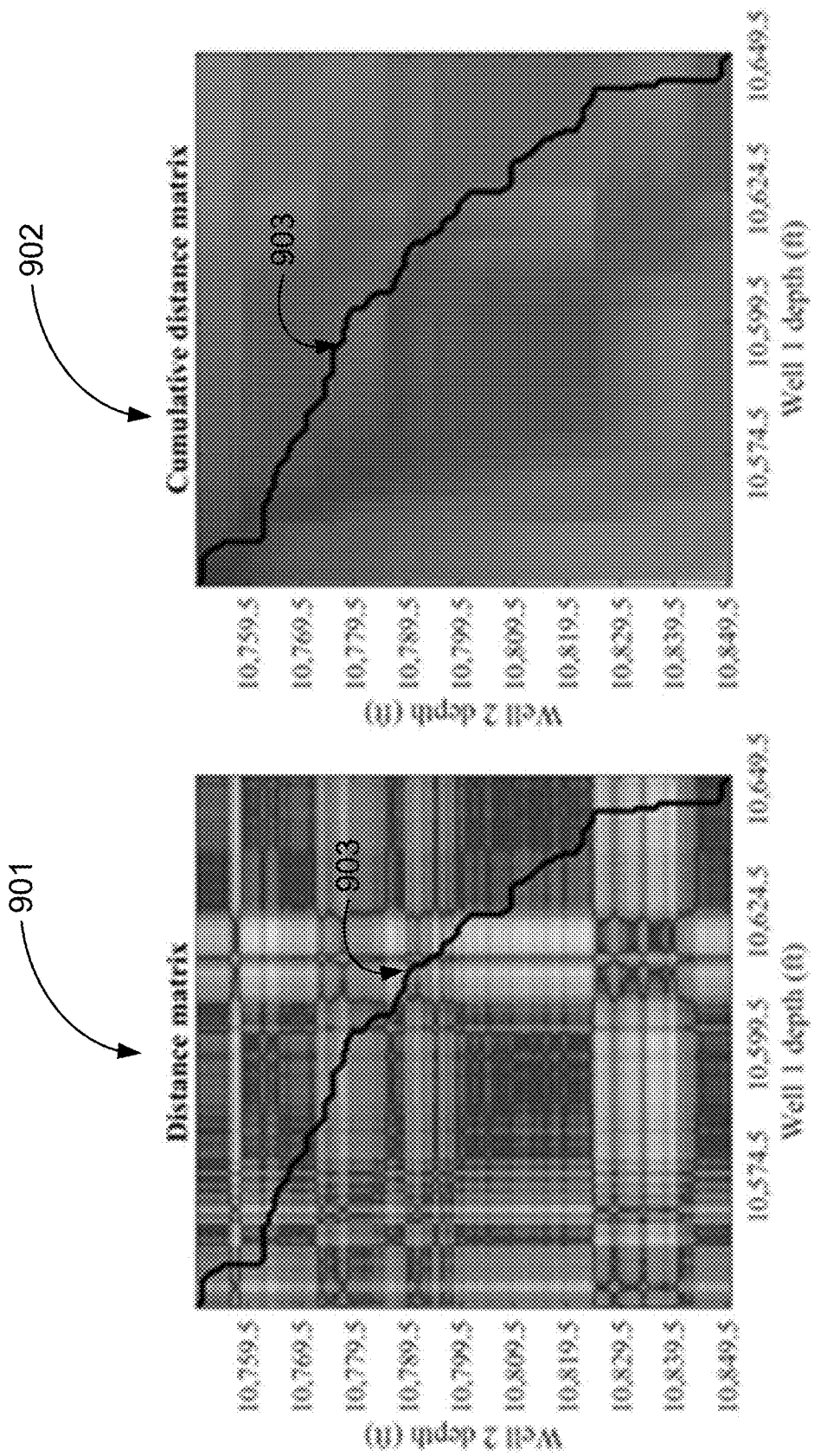
FIG. 9 is an example image illustrating a distance matrix and a cumulative distance matrix calculated using the input data of FIG. 8.

FIG. 9 is an example image illustrating a distance matrix 901 and a cumulative distance matrix 902 calculated using the input data of FIG. 8. As illustrated, the minimum cost path 903 obtained from the cumulative distance matrix 902 is superimposed on both matrices 901, 902.

A generic dynamic time warping process was applied to the data, as well as a stochastic dynamic time warping process (as described previously), and the correlation results were compared.

FIG. 10 is an example image illustrating results of a correlation solution 1000a obtained using generic dynamic time warping compared with results of a correlation solution obtained using stochastic dynamic time warping 1000b, as applied to the input data of FIG. 8. To simplify visualization of the results, only specific markers are plotted. The markers are identified by a changepoint algorithm.

Figure 11:
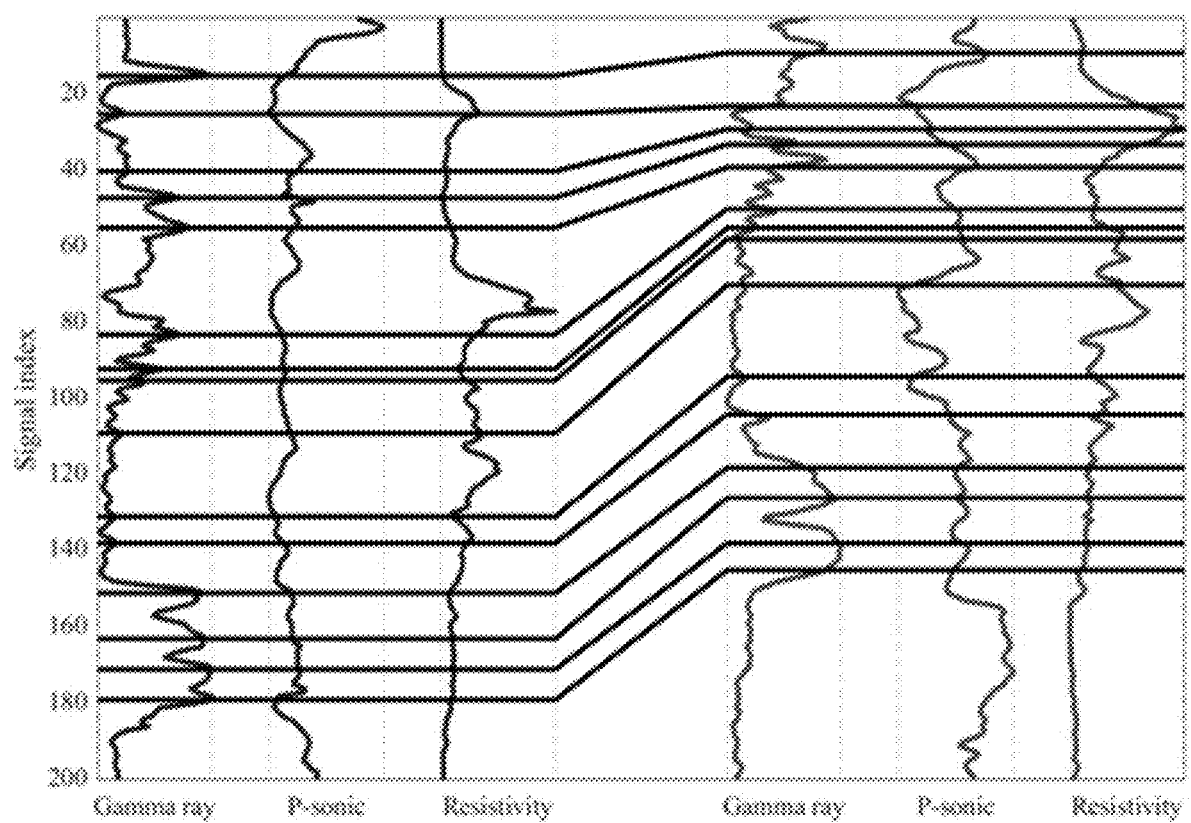
FIG. 11 is an example image illustrating results of a correlation solution obtained using stochastic dynamic time warping having a five-step correlation length.

FIG. 11 shows another solution that, like the image 1000b, is generated using stochastic dynamic time warping. FIG. 11 is an example image illustrating results of a correlation solution obtained using stochastic dynamic time warping having a five-step correlation length. Both of these correlations are statistically possible and thus relying solely on one deterministic solution during risking and decision making, e.g., when picking perforation points, will result in false low risk in the project. Note that some correlation markers are consistent over realizations which indicates higher confidence in the automated interpretation.

Figure 12:
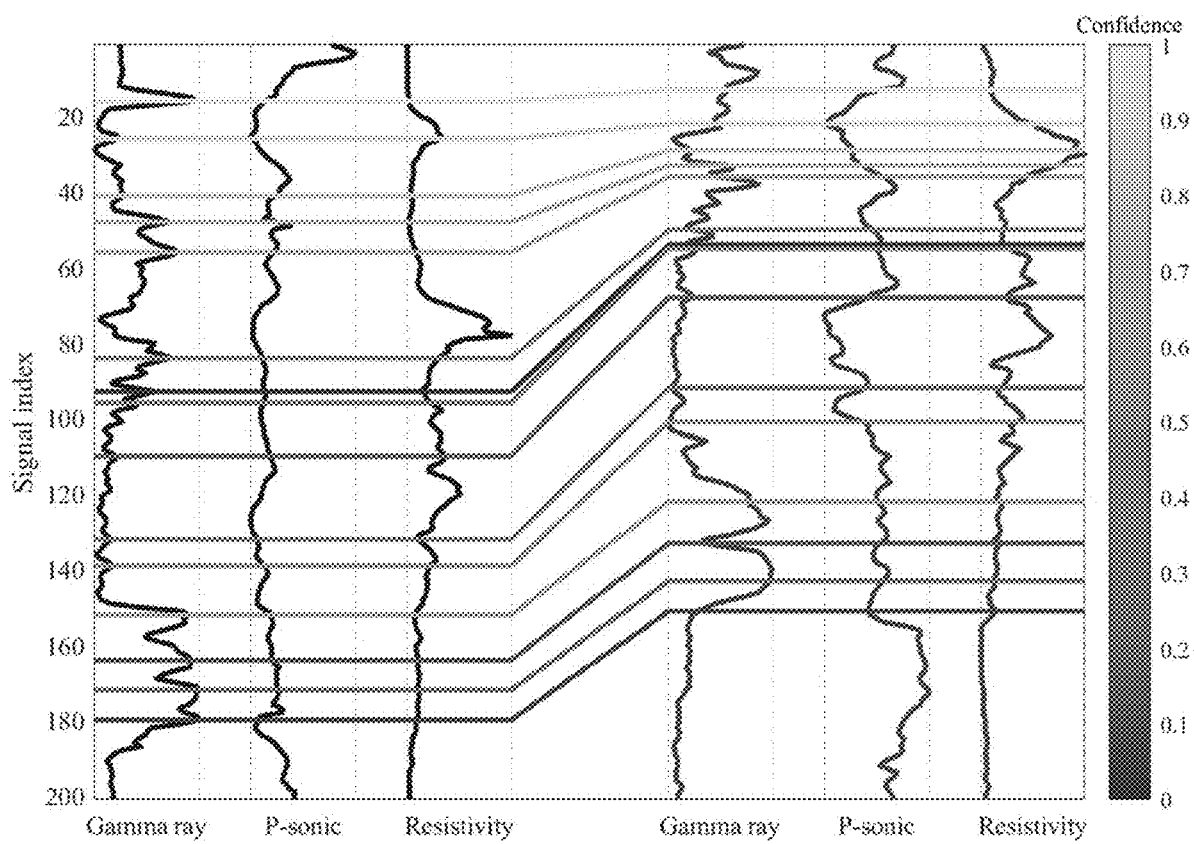
FIG. 12 is a example image illustrating results of a correlation solution for 1000 realizations of stochastic dynamic time warping.

FIG. 12 is an example image illustrating results of a correlation solution for 1000 realizations of stochastic dynamic time warping. The correlation confidence was determined by the ordering the standard deviations in each correlation marker. FIGS. 10-12, demonstrated the strength of the stochastic dynamic time warping process in relation to the generic dynamic time warping process. For example, it was shown that the stochastic dynamic time warping process facilitated the ability to estimate the uncertainty in the most probable interpretation of the generic dynamic time warping process (see FIG. 12). It was also shown that the stochastic dynamic time warping process facilitated the study of uncertainty in the results. The multiple realizations can be used in subsequent analysis, for example, constructing multiple geologic simulation models which can be used for hydrocarbon volumetric estimations and their associated uncertainty. Similarly, constructing multiple reservoir simulation models based on multiple correlations will affect the optimization for hydrocarbon recovery. Thus, gaining knowledge about the level of confidence in the correlation affects the decisions made in the company.

Figure 13:
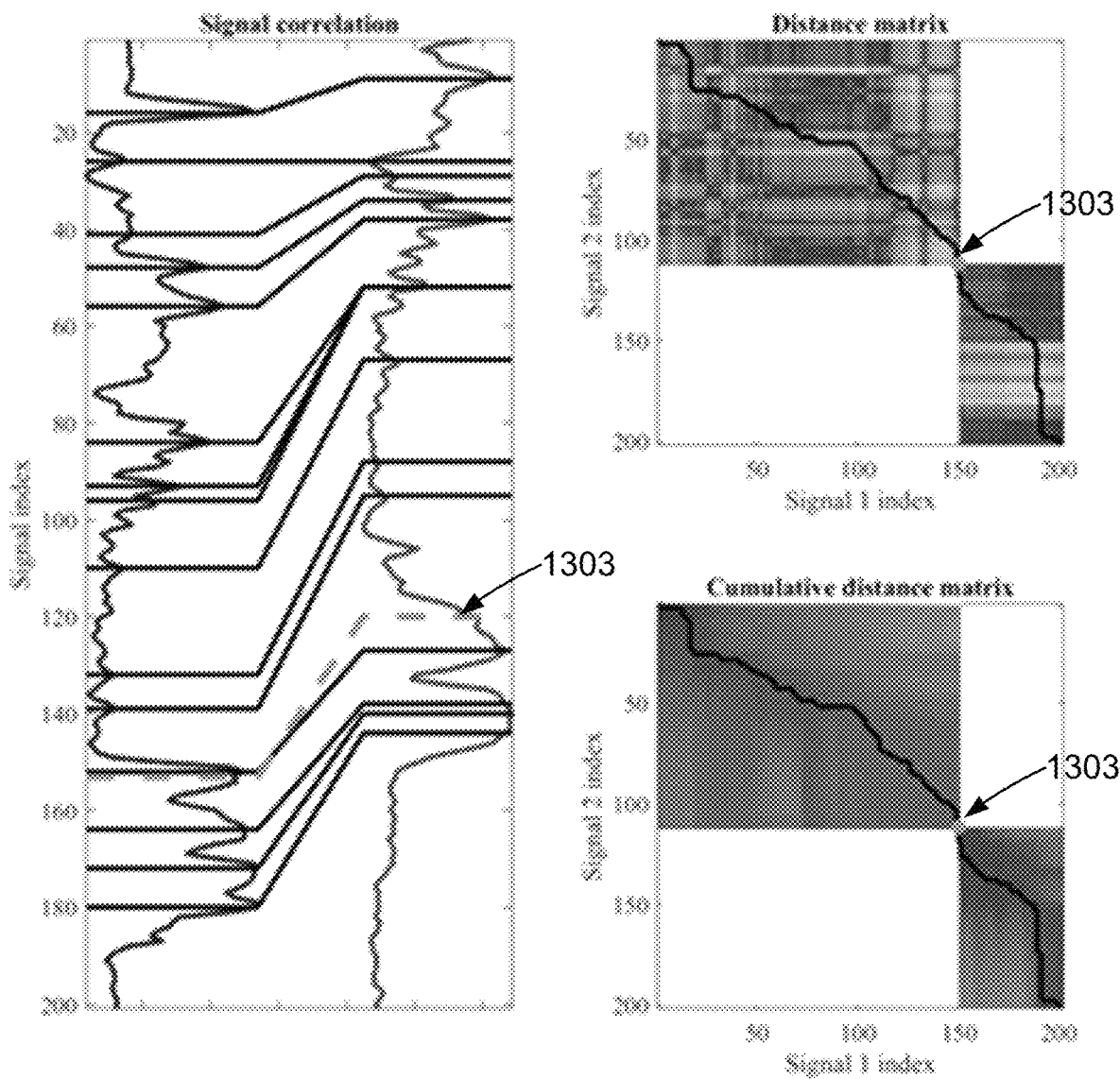
FIG. 13 is an example image illustrating a soft marker constraint.

FIG. 13 is an example image illustrating a soft marker 1303. As shown, a soft marker 1303 was introduced into the correlation. A multivariate normal distribution was used to represent the uncertainty in the marker 1303.

Example Computer System

Figure 14:
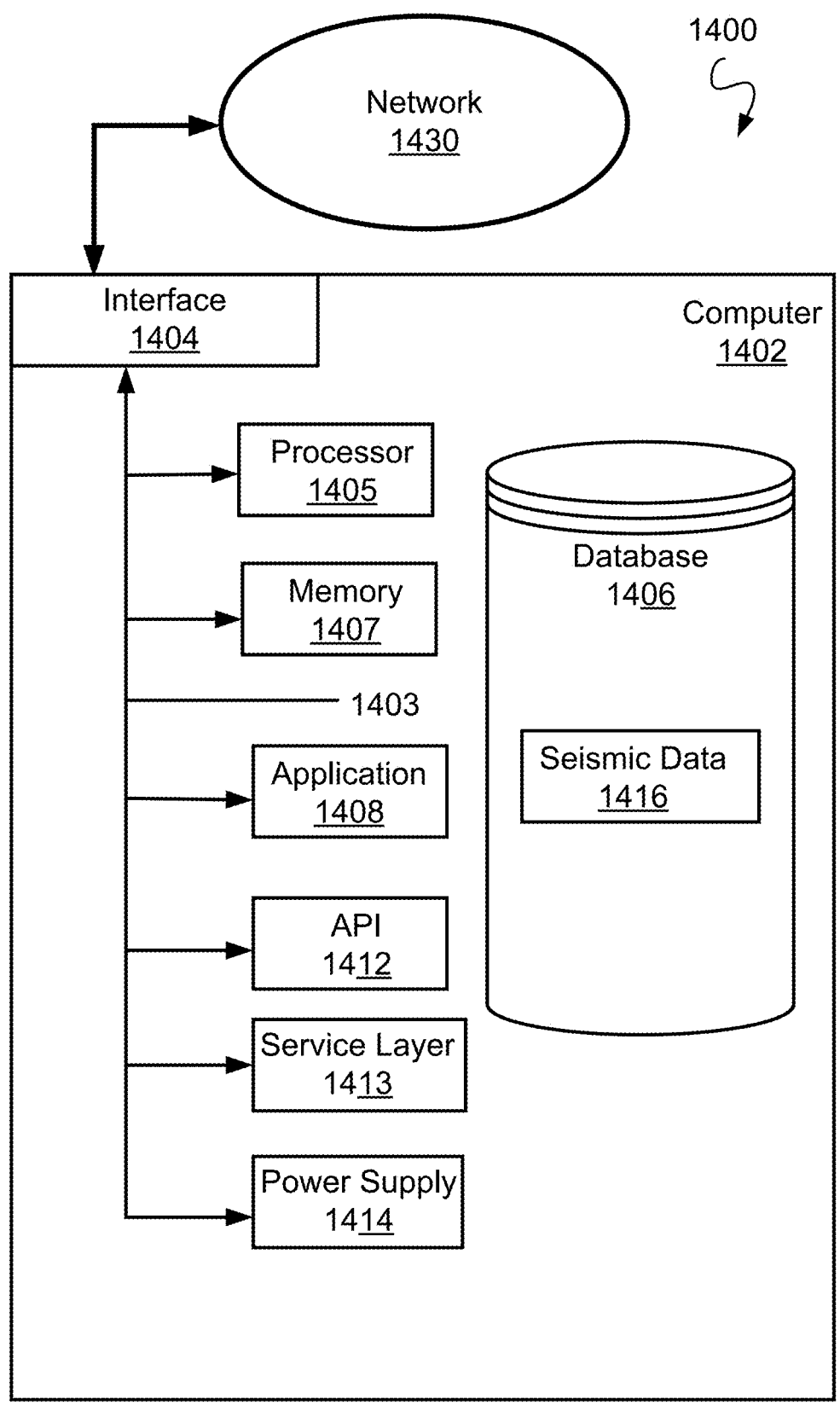
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a high level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both), over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the hardware of the interface can be operable to communicate physical signals within and outside of the illustrated computer 1402.

The computer 1402 includes a processor 1405. Although illustrated as a single processor 1405 in FIG. 11, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data (for example, data 1416) for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. Accordingly, other implementations are within the scope of the following claims.

What is claimed is:

1. A computer-implemented method of generating a model of a subsurface formation using stochastic stratigraphic correlation, the method comprising:
   receiving data representing a plurality of signals representing stratigraphy of the subsurface formation at a plurality of locations;
   performing dynamic time warping, including:
      generating a cumulative distance matrix of the data representing the stratigraphy of the subsurface at least one first location and the data representing the stratigraphy of the subsurface at least one second location; and
      obtaining, by traversing the cumulative distance matrix according to a series of deterministic steps and intermittent stochastic steps, a minimum cost path over the cumulative distance matrix;
   defining, based on the performing, one or more correlations of the stratigraphy of the subsurface formation at the at least one first location and the stratigraphy of the subsurface formation at the at least one second location; and generating the model of the subsurface formation based at least in part on the one or more correlations of the stratigraphy of the subsurface formation at the at least one first location and the stratigraphy of the subsurface formation at the at least one second location;

wherein obtaining a minimum cost path over the cumulative distance matrix includes:
performing a first number of deterministic steps;
determining a correlation measure of the data corresponding to the first number of deterministic steps; and
determining whether to perform a stochastic step based on the correlation measure.

2. The method of claim 1, wherein the plurality of signals correspond to well logs at a plurality of wells.

3. The method of claim 1, wherein the correlation measure comprises a Pearson correlation coefficient.

4. The method of claim 1, wherein performing dynamic time warping further comprises performing the stochastic step if the correlation measure indicates a performance probability that satisfies a performance probability threshold, wherein performing the stochastic step includes converting values of the cumulative distance matrix at one or more possible steps to probabilities to determine a subsequent step.

5. The method of claim 1, wherein obtaining a minimum cost path over the cumulative distance matrix includes:
assigning a plurality of markers to the cumulative distance matrix, each marker corresponding to a point of the cumulative distance matrix; and
defining, for each marker, a probabilistic distribution.

6. The method of claim 1, wherein generating a cumulative distance matrix includes using Euclidian distance measure.

7. The method of claim 1, wherein the dynamic time warping is used to generate multiple viable correlations between the signals.

8. The method of claim 7, further comprising generating a correlation confidence measure for correlations between portions of the stratigraphy of the subsurface formation at one of the first locations and the stratigraphy of the subsurface formation at one of the second locations.

9. The method of claim 8, wherein generating a correlation confidence measure comprises running multiple realizations of the dynamic time warping and ordering standard deviations in correlation markers between locations.

10. A method for stochastic correlation of stratigraphic data in a subsurface formation, the method comprising:
receiving data representing stratigraphy of the subsurface formation at a plurality of locations;
generating a cumulative distance matrix of the data representing the stratigraphy of the subsurface at a first location of the plurality of locations and the data representing the stratigraphy of the subsurface at a second location of the plurality of locations; and
obtaining, by traversing the cumulative distance matrix according to a series of deterministic steps and intermittent stochastic steps, a minimum cost path over the cumulative distance matrix;
defining, based on the performing, one or more correlations of the stratigraphy of the subsurface formation at the first location and the stratigraphy of the subsurface formation at the second location; and
generating a correlation confidence measure for correlation markers indicating corresponding portions of the stratigraphy of the subsurface formation at the first location and the stratigraphy of the subsurface formation at the second location;
wherein obtaining a minimum cost path over the cumulative distance matrix includes:
performing a first number of deterministic steps;
determining a correlation measure of the data corresponding to the first number of deterministic steps; and
determining whether to perform a stochastic step based on the correlation measure.

11. The method of claim 10, further comprising generating a model of the subsurface formation based at least in part on the one or more correlations of the stratigraphy of the subsurface formation at different locations of the plurality of locations.

12. The method of claim 10, wherein the data representing stratigraphy of the subsurface formation at a plurality of locations comprise well logs at a plurality of wells.

13. The method of claim 10, wherein the correlation measure comprises a Pearson correlation coefficient.

14. The method of claim 10, wherein performing dynamic time warping further comprises performing the stochastic step if the correlation measure indicates a performance probability that satisfies a performance probability threshold, wherein performing the stochastic step includes converting values of the cumulative distance matrix at one or more possible steps to probabilities to determine a subsequent step.

15. The method of claim 1, wherein obtaining a minimum cost path over the cumulative distance matrix includes:
assigning a plurality of markers to the cumulative distance matrix, each marker corresponding to a point of the cumulative distance matrix; and
defining, for each marker, a probabilistic distribution.

16. The method of claim 10, wherein generating a cumulative distance matrix includes using Euclidian distance measure.

17. The method of claim 10, wherein the dynamic time warping is used to generate multiple viable correlations between the signals.

18. The method of claim 10, wherein generating a correlation confidence measure comprises running multiple realizations of the dynamic time warping and ordering standard deviations in correlation markers between locations.

19. A method for stochastic correlation of stratigraphic data in a subsurface formation, the method comprising:
receiving data representing stratigraphy of the subsurface formation at a plurality of locations;
generating a cumulative distance matrix of the data representing the stratigraphy of the subsurface at a first location of the plurality of locations and the data representing the stratigraphy of the subsurface at a second location of the plurality of locations; and
obtaining, by traversing the cumulative distance matrix according to a series of deterministic steps and intermittent stochastic steps, a minimum cost path over the cumulative distance matrix;
defining, based on the performing, one or more correlations of the stratigraphy of the subsurface formation at the first location and the stratigraphy of the subsurface formation at the second location; and
generating a correlation confidence measure for correlation markers indicating corresponding portions of the stratigraphy of the subsurface formation at the first location and the stratigraphy of the subsurface formation at the second location;
wherein obtaining a minimum cost path over the cumulative distance matrix includes:
  assigning a plurality of markers to the cumulative distance matrix, each marker corresponding to a point of the cumulative distance matrix; and
  defining, for each marker, a probabilistic distribution.

\* \* \* \* \*